United States Patent
Leonard

(10) Patent No.: US 8,536,075 B2
(45) Date of Patent: Sep. 17, 2013

(54) ELECTRONIC SYSTEMS INCORPORATED INTO TEXTILE THREADS OR FIBRES

(76) Inventor: Philip Noel Leonard, Chepstow (GB)

(*) Notice: Subject to any disclaimer, the term of this patent is extended or adjusted under 35 U.S.C. 154(b) by 1015 days.

(21) Appl. No.: 10/474,878

(22) PCT Filed: Apr. 10, 2002

(86) PCT No.: PCT/GB02/01658
§ 371 (c)(1),
(2), (4) Date: Nov. 24, 2003

(87) PCT Pub. No.: WO02/084617
PCT Pub. Date: Oct. 24, 2002

(65) Prior Publication Data
US 2004/0115430 A1    Jun. 17, 2004

(30) Foreign Application Priority Data
Apr. 10, 2001  (GB) .................................. 0108950.7

(51) Int. Cl.
 *D03D 15/00* (2006.01)
 *D03D 11/00* (2006.01)
 *B32B 9/00* (2006.01)
 *F21V 21/08* (2006.01)

(52) U.S. Cl.
 USPC ........... 442/301; 442/185; 442/205; 442/229; 428/690; 428/917; 313/511; 362/103; 362/108; 362/556; 362/806; 362/812

(58) Field of Classification Search
 USPC .............................. 442/189, 217, 301, 181, 30
 See application file for complete search history.

(56) References Cited

U.S. PATENT DOCUMENTS

| | | | | | |
|---|---|---|---|---|---|
| 4,234,907 | A | * | 11/1980 | Daniel | 362/556 |
| 5,312,500 | A | * | 5/1994 | Kurihara et al. | 156/62.4 |
| 5,767,824 | A | * | 6/1998 | Jacobsen | 345/55 |
| 5,906,004 | A | * | 5/1999 | Lebby et al. | 442/210 |
| 6,080,690 | A | * | 6/2000 | Lebby et al. | 442/209 |
| 6,158,884 | A | * | 12/2000 | Lebby et al. | 368/282 |
| 6,329,917 | B1 | * | 12/2001 | Leonard | 340/572.8 |
| 6,381,482 | B1 | * | 4/2002 | Jayaraman et al. | 600/388 |

FOREIGN PATENT DOCUMENTS
WO      WO 98/33155 A1    7/1998

OTHER PUBLICATIONS

"Bringing DNA Computers to Life;" Scientific American; May 2006.*
"Elasto Twist by Hamel for a world of quality and comfort;" undated.*
"Bell Labs Builds Smallest Transistor;" Nov. 19, 1997.*
Merriam-Webster Online Dictionary. http://www.merriam-webster.com/dictionary/array. undated.*
Complete Textile Glossary. Celanese Acetate LLC. copyright 2001. pp. 1-5.*

* cited by examiner

Primary Examiner — Elizabeth Cole
Assistant Examiner — Altrev Sykes
(74) Attorney, Agent, or Firm — Edwin D. Schindler

(57) ABSTRACT

A textile thread or fiber has a plurality of elements, such as electronic elements, embedded or encapsulated therein. The textile thread or fiber could also be part of a fabric article. The textile thread or fiber, for example, has the plurality of elements interconnected, or otherwise intercommunicating, with one another to form a signal processing system. This signal processing system may include, for example, a personal computer system, a personal telecommunications transmitter/receiver system or a personal television and/or radio system.

16 Claims, 2 Drawing Sheets

ELECTRONIC SYSTEMS INCORPORATED INTO TEXTILE THREADS OR FIBRES

The present invention relates to electronic or equivalent signal-processing systems incorporated into textile threads or fibres, or into the textile threads or fibres of a piece of fabric.

In one aspect, the present invention relates to personal computer systems, personal telecommunications transmitter/receiver systems and to personal television and/or radio systems: by "personal" is meant for use by an individual person, whether for commercial business or his own private affairs.

The use of mobile personal computer systems and personal (mobile) telephones has become widespread and is becoming increasingly widespread. It is common for laptop computers to be carried from home to the office and away on business etc: laptop computers have become much reduced in size and weight but are still bulky to carry and are susceptible to being lost, or forgotten or stolen. Mobile telephones have become small in size and weight but are again susceptible to being lost or forgotten or stolen. Furthermore, modern lifestyles demand ever more convenience in relation to personal computers, mobile telephones etc.

I have now devised arrangements which alleviate the above-noted problems in relation to personal computers and mobile telephones, but may also be used with advantage for personal television and/or radio receiver systems, and for a wide variety of other systems.

In accordance with the present invention, there is provided a textile thread or fibre having a plurality of elements embedded or encapsulated therein, or a piece of fabric or a fabric article having a plurality of elements embedded or encapsulated in textile threads or fibres thereof, said plurality of elements being interconnected or otherwise intercommunicating to form a signal processing system.

The embedded or encapsulated elements will typically comprise active elements and may comprise electronic integrated circuits. It is nowadays possible to manufacture such integrated circuits of extremely small size: such an integrated circuit may therefore be embedded or encapsulated within a textile thread or fibre without unacceptably increasing, or increasing at all, the diameter of the thread or fibre at the location of the integrated circuit.

Instead, the embedded or encapsulated elements may comprise optical, molecular, sub-molecular or DNA strand elements, forming an optical, molecular, sub-molecular or DNA strand signal processing system. Such elements may be of biological or non-biological origin or derivation.

Preferably the embedded or encapsulated elements are elongate in shape, aligned lengthwise of the fibre or thread.

The textile thread or fibre may be of unitary form with the system elements embedded in it. Alternatively, the thread or fibre may be formed of a plurality of filaments stranded together and enclosing the system elements.

The plurality of system elements may be encapsulated at intervals along the length of the thread or fibre and may be electrically interconnected by electrically conductive filaments extending along the thread or fibre: such filaments may also be embedded or encapsulated within the thread or fibre; where the thread or fibre is formed of a plurality of filaments stranded together to enclose the system elements, some of these filaments may comprise electrically conductive filaments electrically interconnecting the system elements. At least some of the system elements may communicate between each other by radio transmission or by optical transmission (e.g. infrared transmission).

Instead of all elements of the system being carried within a single thread or fibre, these system elements may be distributed over a number of such threads or fibres. Preferably a piece of fabric is formed at least in part from such threads or fibres, the elements of the different threads or fibres being connected together, or otherwise intercommunicating to form the overall system.

As previously noted, the system elements may be interconnected or otherwise intercommunicate to form (1) a personal computer system, or (2) a personal communications transmitter/receiver system or (3) a television and/or radio receiver system. In accordance with the invention, a garment (such as a coat or jacket) may be made from a textile fabric, one or more threads or fibres of which include elements forming a personal computer system, or a telecommunications transmitter/receiver system, or a television and/or radio receiver system. Two or more pieces of fabric (or two or more garments) may be linked or coupled together to form the system.

The system thus incorporated into a garment or piece of fabric will generally include one or more interfaces to associated devices, as follows.

Thus, in the case of a personal computer system, the system elements will typically include one or more microprocessors and one or more program memories. It will further include an interface to a visual display and an interface to a keyboard or other data entry device. It may further include an interface to other memory devices such as disc or tape drive devices: it may include one or more interfaces to other input or output devices, e.g. scanners, printers; it may include a modem. The system may include an interface to an external radio transmitter/receiver, and/or an interface to an external processor.

In the case of a personal telecommunications transmitter/receiver (particularly a mobile telephone), the system elements will typically include an interface to a visual display and an interface to a keyboard or other data entry device. Preferably the system elements include a signal transmitter/receiver, connected to an aerial or antenna: the aerial or antenna may be embedded or encapsulated within the textile thread or fibre or may be provided by one of the filaments from which the thread or fibre is stranded. Interfaces to various other input or output devices and/or an external aerial or antenna may be included.

In the case of a television receiver system, the system elements will typically include an interface to a visual display and an interface to one or more speakers. Further, an aerial or antenna will be provided, preferably embedded or encapsulated within the textile thread(s) or fibre(s).

It will be appreciated that, in accordance with the present invention, a garment may be made which incorporates a personal computer system or a mobile phone system or a television and/or radio receiver system (or any combination of these systems). The wearer of the garment will then automatically carry his personal computer system etc. with him, with substantially reduced risk of losing it or having it stolen, and with substantially increased convenience. The various devices with which the system must interface, particularly video display, keyboard etc. may themselves incorporated into or secured to the garment: for example the video display may be incorporated on one sleeve of the garment, for example where the garment is a coat or jacket. Alternatively, or in addition, the system may interface with external devices which are kept in the home or office, or onboard vehicles, trains, aircraft, etc.

The system elements may be arranged to form a wide variety of signal processing systems, whether for personal use or otherwise. For example, the signal processing system may comprise a control system, monitoring system, an alarm or security system, a data recording system or an information presentation system. Such systems may be incorporated into the upholstery or linings of a car or other vehicle or an aircraft or boat etc., or in upholstery, curtaining etc. in the home, office or elsewhere. Such systems may be incorporated into fabric tape, which can then be used in a wide variety of applications.

In each of the above-described systems, a rechargeable battery/or other current source may be included, embedded or encapsulated within the textile thread(s) or fibre(s), and the system elements preferably include a recharging circuit for the battery or other current source. Preferably the latter circuit acts to recharge the current source continuously, e.g. in response to solar energy, the body heat of a person wearing the garment incorporating the system, or movement of that person. The system may instead be powered from an external current source for example carried by the person wearing the garment, e.g. in a socket of the garment. In all of the above cases, the current source may comprise a charge storage device, e.g. an electrical capacitor.

Embodiments of the present invention will now be described by way of examples only, in which.

Figure 1:
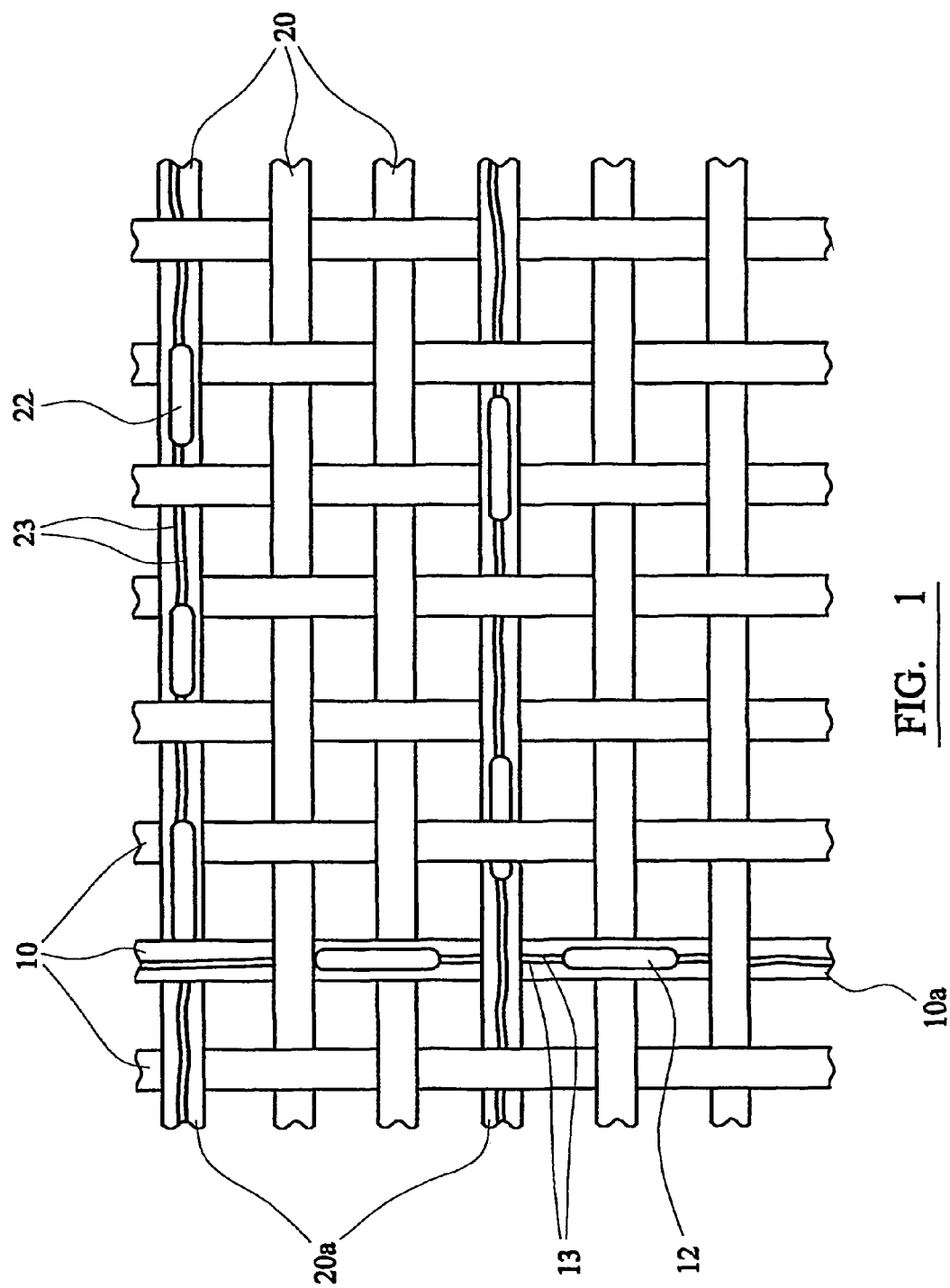
FIG. 1 is an enlarged schematic view of a portion of a piece of fabric having integrated circuits embedded in fibres thereof.

Referring to FIG. 1 of the drawings, there is shown a portion of a piece of fabric, from which a garment may be formed. The piece of fabric is formed of a number of textile threads or fibres: in the example shown, the fabric is formed by weaving and comprises warp and weft threads or fibres 10, 20; the fabric may instead be formed by knitting or otherwise. The threads or fibres may comprise natural or synthetic fibres or a mixture thereof.

As shown in FIG. 1, some of the threads or fibres 10a,20a have integrated circuits 12,22 embedded or encapsulated in them. These integrated circuits are of miniature or lesser size, such that the diameter of the thread 10a,20a, at the location of each integrated circuit, is not increased (or at least not significantly or unacceptably increased).

The threads or fibres 10,20 may be of unitary form (e.g. mono-filament), with the integrated circuits 12,22 embedded in them. Instead, the threads or fibres may be formed of a plurality of filaments stranded together, the respective threads or fibres 10a,20a enclosing their integrated circuits 12,22.

The integrated circuits 12,22 are of elongate shape, aligned lengthwise of their respective threads or fibres and spaced-apart along them, to maintain the overall flexibility of the threads or fibres. The integrated circuits of each thread or fibre are electrically interconnected by flexible filaments 13,23 extending between them: interconnections (not shown) are also made between the integrated circuits of different threads or fibres. At least some of the integrated circuits may be arranged to communicate by radio or optical transmission.

Figure 2:
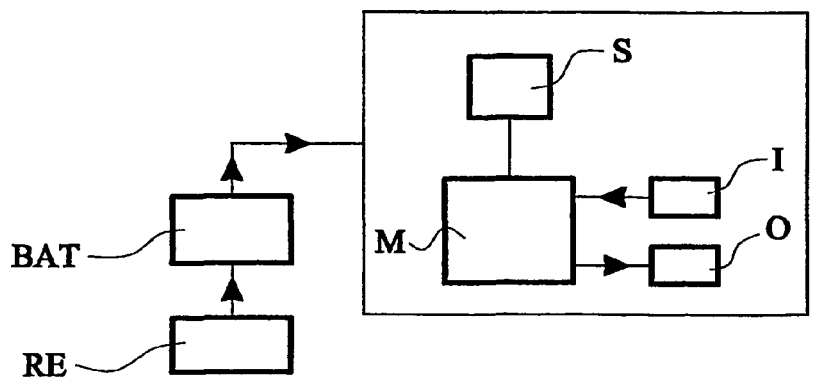
FIG. 2 is a schematic block diagram of a personal computer system which may be formed by the integrated circuits of the piece of fabric shown in FIG. 1.

Collectively, and in one example, the integrated circuits 12,22 may form a personal computer system, a schematic block diagram thereof being shown in FIG. 2. In this example, the integrated circuits include one or more microprocessors M and one or more solid state program memory devices S. The integrated circuits also include interfaces I, O for connection to computer peripherals, including a visual display, a keyboard or other input device, a printer or other output device, and a disc drive. The system may include one or more transducers or instruments (e.g. accelerometers, temperature sensors, microphones, cameras, speakers). The piece of fabric is preferably formed into a garment, such that the garment incorporates the computer system formed by the integrated circuits embedded in the threads or fibres. Two or more pieces of fabric or garments may be connected together or communicate together to form the computer system, particularly for example to form a parallel processing system, or to form a neural network, or a Local Area Network, or even an Extended Area Network.

Figure 3:
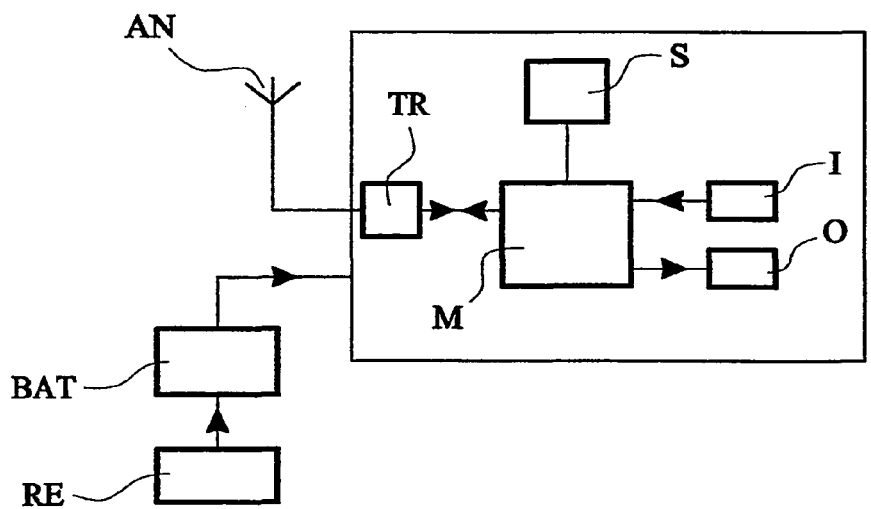
FIG. 3 is a schematic block diagram of a personal telecommunications transmitter/receiver system which may be followed by the integrated circuits of the piece of fabric shown in FIG. 1.

In another example, the integrated circuits 12,22 shown in FIG. 1 may form a personal telecommunications transmitter/receiver system, a schematic block diagram thereof being shown in FIG. 3. In this example, the integrated circuits include one or more microprocessors M, one or more solid state memory devices S, an interface I to a keyboard or other data entry device and an interface O to a visual display: the system further comprises a transmitter/receiver sub-system TR, to which an aerial or antenna AN is connected.

Figure 4:
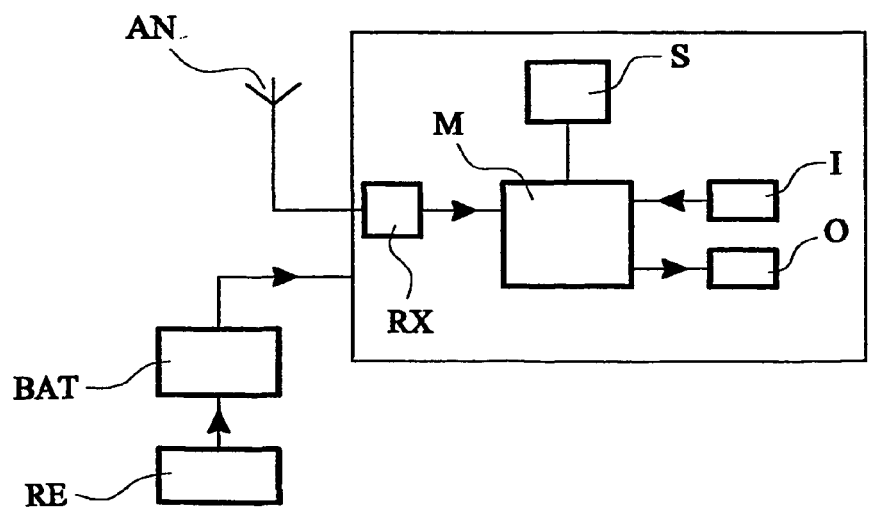
FIG. 4 is a schematic block diagram of a television and/or radio receiver system which may be formed by the integrated circuits of the piece of fabric shown in FIG. 1.

In a further example, the integrated circuits shown in FIG. 1 may form a personal television and/or receiver system, a schematic block diagram of which is shown in FIG. 4. In this example, the integrated circuits include one or more microprocessors M, one or more solid state memory device S, an interface I to controls and interfaces O to a visual display and one or more speakers: the system further comprises a receiver sub-system RX to which an aerial AN is connected.

In each of the systems shown in FIGS. 2 to 4, a battery or other rechargeable power source BAT is provided, together with a recharging sub-system RE.

Whilst the embodiments shown in the drawings comprise electronic systems formed of integrated circuits, they may instead comprise optical, molecular, sub-molecular or DNA strand systems, formed of optical, molecular, sub-molecular or DNA strand elements, which may be of biological or non-biological origin or derivation.

The invention claimed is:

1. A fabric article formed of a plurality of textile threads, comprising:
    a plurality of integrated circuits encapsulated in one or more individual textile threads, together forming at least a portion of said textile threads, said plurality of integrated circuits including at least one microprocessor and least one memory element; and,
    means for interconnecting individual integrated circuits of said plurality of integrated circuits for permitting said individual integrated circuits to intercommunicate with one another for forming a signal processing system.

2. The fabric article according to claim 1, wherein at least a portion of said plurality of integrated circuits include means for interconnecting with one another via radio transmission.

3. The fabric article according to claim 1, wherein at least a portion of said plurality of integrated circuits include means for interconnecting with one another via optical transmission.

4. The fabric article according to claim 1, wherein each integrated circuit of said plurality of integrated circuits is elongate in shape and aligned lengthwise within its respective textile thread.

5. The fabric article according to claim 1, wherein at least one integrated circuit of said plurality of integrated circuits includes an interface to additional circuits.

6. The fabric article according to claim 1, further comprising an antenna embedded or encapsulated in said textile thread and connected to an integrated circuit of said plurality of integrated circuits.

7. An individual textile thread, comprising:
- a plurality of integrated circuits encapsulated in said individual textile thread;
- at least one microprocessor included as part of said plurality of integrated circuits;
- at least one data memory element included as part of said plurality of integrated circuits; and,
- means for interconnecting individual integrated circuits of said plurality of integrated circuits for permitting said individual integrated circuits to intercommunicate with one another for forming a signal processing system.

8. The individual textile thread according to claim 7, wherein a portion of said plurality of integrated circuits include means for interconnecting with one another via radio transmission.

9. The individual textile tread according to claim 7, wherein a portion of said plurality of integrated circuits include means for interconnecting with one another via optical transmission.

10. The individual textile thread according to claim 7, wherein each integrated circuit of said plurality of integrated circuits is elongate in shape and aligned lengthwise within said textile thread.

11. The individual textile thread according to claim 7, wherein at least one integrated circuit of said plurality of integrated circuits includes an interface to additional devices.

12. The individual textile thread according to claim 7, further comprising an antenna embedded or encapsulated in said textile thread and connected to an integrated circuit of said plurality of integrated circuits.

13. The individual textile thread according to claim 7, wherein said means for interconnecting individual integrated circuits of said plurality of integrated circuits includes electrically interconnecting at least a portion of said plurality of integrated circuits via flexible filament extending between two or more integrated circuits.

14. The individual textile thread according to claim 7, wherein said signal processing system formed via said means for interconnecting individual integrated circuits of said plurality of integrated circuits includes interface means for connecting to peripherals.

15. The fabric article according to claim 1, wherein said means for inter-connecting individual integrated circuits of said plurality of integrated circuits includes electrically interconnecting at least a portion of said plurality of integrated circuits via flexible filament extending between two or more integrated circuits.

16. The fabric article according to claim 1, wherein said signal processing system formed via said means for interconnecting individual integrated circuits of said plurality of integrated circuits includes interface means for connecting to peripherals.

* * * * *